(12) United States Patent
Lee

(10) Patent No.: US 10,226,834 B2
(45) Date of Patent: Mar. 12, 2019

(54) WELDING GUN ALIGNMENT DETECTION DEVICE

(71) Applicant: Hyundai Motor Company, Seoul (KR)

(72) Inventor: Hyunwoo Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 840 days.

(21) Appl. No.: 14/862,851

(22) Filed: Sep. 23, 2015

(65) Prior Publication Data

US 2016/0303681 A1    Oct. 20, 2016

(30) Foreign Application Priority Data

Apr. 17, 2015    (KR) .................. 10-2015-0054691

(51) Int. Cl.
*B23K 11/36* (2006.01)
*B23K 11/30* (2006.01)

(52) U.S. Cl.
CPC .......... *B23K 11/36* (2013.01); *B23K 11/3063* (2013.01)

(58) Field of Classification Search
CPC ..................................... B23K 11/36
USPC ........................ 33/613, 626, 645
See application file for complete search history.

(56) References Cited

U.S. PATENT DOCUMENTS

| | | | | |
|---|---|---|---|---|
| 6,813,843 B1* | 11/2004 | Faubion | ............ | B23Q 17/2233 33/520 |
| 8,457,786 B2* | 6/2013 | Andersson | ........... | G05B 19/401 33/558.2 |
| 2006/0112580 A1* | 6/2006 | DeKeyser | ................. | B25C 7/00 33/626 |
| 2015/0102021 A1* | 4/2015 | Lee | ..................... | B23K 26/0823 219/121.63 |
| 2015/0183050 A1* | 7/2015 | Lee | ......................... | B23K 11/11 219/86.41 |
| 2016/0221110 A1* | 8/2016 | Okada | ................. | B23K 11/3009 |
| 2018/0023939 A1* | 1/2018 | Hicks | ..................... | B23P 19/10 33/645 |
| 2018/0236594 A1* | 8/2018 | Gattabria | .............. | B23K 11/311 |

FOREIGN PATENT DOCUMENTS

| | | |
|---|---|---|
| JP | 2004-535302 A | 11/2004 |
| KR | 10-0829476 B1 | 5/2008 |
| KR | 10-1448771 B1 | 6/2011 |
| KR | 10-1278543 B1 | 6/2013 |

\* cited by examiner

*Primary Examiner* — G. Bradley Bennett
(74) *Attorney, Agent, or Firm* — Mintz Levin Cohn Ferris Glovsky and Popeo, P.C.; Peter F. Corless

(57) ABSTRACT

A welding gun alignment detection device is provided. The device includes an upper block, a lower block, a housing, and a side pressure sensor. The upper block includes a central portion that has an upper tip insertion bore opened upward. The lower block is disposed under the upper block and has a central portion with a lower tip insertion bore opened downward. The housing includes the upper block and the lower block disposed therein and includes inner sides each facing outer sides of the upper block and the lower block. The side pressure sensor is configured to detect a force transferred to the inner side of the housing due to a movement of the upper block and the lower block.

15 Claims, 9 Drawing Sheets

WELDING GUN ALIGNMENT DETECTION DEVICE

CROSS-REFERENCE TO RELATED APPLICATION

This application claims priority to and the benefit of Korean Patent Application No. 10-2015-0054691 filed in the Korean Intellectual Property Office on Apr. 17, 2015, the entire contents of which are incorporated herein by reference.

BACKGROUND (a) Field of the Invention

The present invention relates to a welding gun alignment detection device capable of inspecting whether a pair of upper and lower tips that are aligned straight in a spot welding gun is matched.

(b) Description of the Related Art

A type of resistance welding technology called spot welding involves a technique for welding metal sheets by first pressing a pair of upper and lower tips when the metal sheets are inserted between the tips while being folded by two or three sheets and then applying a current to the pressed tips to generate resistance heating at a contact surface. During the spot welding, a distribution of current flowing in a metal member and a pressing force has a significant impact on the quality of welding. Additionally, a shape and an alignment of the upper and lower tips contacting the metal sheet are also factors that affect the quality of welding. A robot system configured to include an industrial articulated welding robot having a repeated position error of about 0.05 mm, a spot welding gun, a tip dresser, and other peripheral devices are used to produce welding products.

After beginning a welding operation, a welding robot with the spot welding gun transfers a welded part of a tip to the tip dresser. The tip dresser removes any deformation and an oxide film from the welded part of the tip that may be caused by pressing and heating. The tip dresser also processes the welded part of the tip to recover the tip's original shape. A central axis line of the tip matches an aligning reference line X-X of the tip that is set in the welding robot to adjust a moving position of the tip. However, a length of the tip may decrease over time due to continued use, at which point the tip may need to be exchanged with a new tip. In the exchange process, a holder part of the spot welding gun may bend and the upper and lower tips may become mismatched due to pressure and high heat during the welding. A welding operation may not be possible when the upper and lower tips of the spot welding gun do not match the aligning reference line X-X, and the shape of the welded part may not be able to be cut when the tip dresser dresses the upper and lower tips simultaneously, leading to welding defects.

The upper and lower tips of the spot welding gun are set widely apart from one another. A worker therefore may not be able to confirm visually whether the central axis line of the tips is mismatched compared to the aligning reference line X-X. As a result, the misalignment may cause welding defects that may only be found when the worker examines the welded state of a product after the welding operation has been completed. Only discovering welding defects after products have been welded may cause problems, a waste of time, and an economic loss.

The above information disclosed in this section is merely to assist in understanding the background of the invention and should not be interpreted as limiting the disclosed subject matter provided herein in any way.

SUMMARY

The present invention provides a welding gun alignment detection device that is configured to detect an alignment of upper and lower tips of the welding gun and correct the alignment to reduce welding defects and improve production costs and quality of a vehicle.

An exemplary embodiment provides a welding gun alignment detection device that may include an upper block, a lower block, a housing, and a side pressure sensor. The upper block may include a central portion having an upper tip insertion bore opened upward. The lower block may be disposed under the upper block and may include a central portion having a lower tip insertion bore opened downward. The housing may include the upper block and the lower block disposed therein and may have inner sides each facing outer sides of the upper block and the lower block. The side pressure sensor may be configured to detect a force transferred to the inner side of the housing due to a movement of the upper block and the lower block. The welding gun alignment detection device may also include an upper cover and a lower cover configured to cover an upper portion and a lower portion of the housing, respectively, to expose the upper tip insertion bore and the lower tip insertion bore upward and downward. The side pressure sensor may also include an upper sensor configured to correspond to a side of the upper block and a lower sensor configured to correspond to a side of the lower block.

A reference line passing through centers of the upper tip insertion bore and the lower tip insertion bore may be formed. Additionally, at least two radial axes may be radially formed vertically from the reference line, and the outer sides may each be vertically formed to the radial axes. The welding gun alignment detection device may additionally include a pressure transfer part disposed between the outer side of the upper block and the inner side of the housing to transfer a pressure. The pressure transfer part may also include a pressure transfer protrusion that protrudes from the outer side of the upper block and a swivel member configured to be interposed between the pressure transfer protrusion and the inner side of the housing. The swivel member may be rotatably disposed in a multi-axis direction using a ball and a ball groove.

The ball may be formed at the pressure transfer protrusion, and the ball groove may be formed at the swivel member. The pressure transfer protrusion may be fastened with the swivel member in the structure in which the ball is inserted into the ball groove. The radial axes may include at least two radial axes, and the outer sides and the inner sides may include at least two outer sides and at least two inner sides. The radial axes may also each be disposed at about an equal angle.

The welding gun alignment detection device may additionally include a calculator configured to calculate motion directions and motion amounts (e.g. direction and magnitude of horizontal movement, vertical movement, angular displacement, etc.) of the upper block and the lower block based on a pressure applied from the outer sides toward the inner sides using the side pressure sensor and an output unit configured to output results calculated by the calculator. The output unit may be configured to display an alignment of an upper tip inserted into the upper tip insertion bore and a lower tip inserted into the lower tip insertion bore on a display and by numerical values.

Another exemplary embodiment provides a welding gun alignment detection device that may include an upper block, a lower block, a housing, a side pressure sensor, and a calculator. The upper block may include a central portion having an upper tip insertion bore opened upward. The lower block may be disposed under the upper block and may include a central portion having a lower tip insertion bore opened downward. The housing may include the upper block and the lower block disposed therein and have inner sides each facing outer sides of the upper block and the lower block. The side pressure sensor may be configured to detect a force transferred to the inner side of the housing due to a movement of the upper block and the lower block. The calculator may be configured to calculate pressure values transferred from the upper block and the lower block by the side pressure sensor. The calculator may also be configured to calculate motion directions and motion amounts (e.g. direction and magnitude of horizontal movement, vertical movement, angular displacement, etc.) of the upper block and the lower block based on the pressure values. The welding gun alignment detection device may further include an output unit configured to output the pressure value calculated by the calculator and the motion directions and amounts of the upper block and the lower block. According to an exemplary embodiment of the present invention, the pressure sensor which detects the motions of the upper block into which the upper tip is inserted and the lower block into which the lower tip is inserted is installed in the housing to detect the motion amount and direction of the upper and lower blocks, thereby easily detecting the leaned direction and the leaned amount of the upper and lower tips.

BRIEF DESCRIPTION OF THE DRAWINGS

The drawings are for reference in describing an exemplary embodiment of the present invention, so that it shall not be construed that the technical spirit of the present invention is limited to the accompanying drawings.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings.

Figure 1:
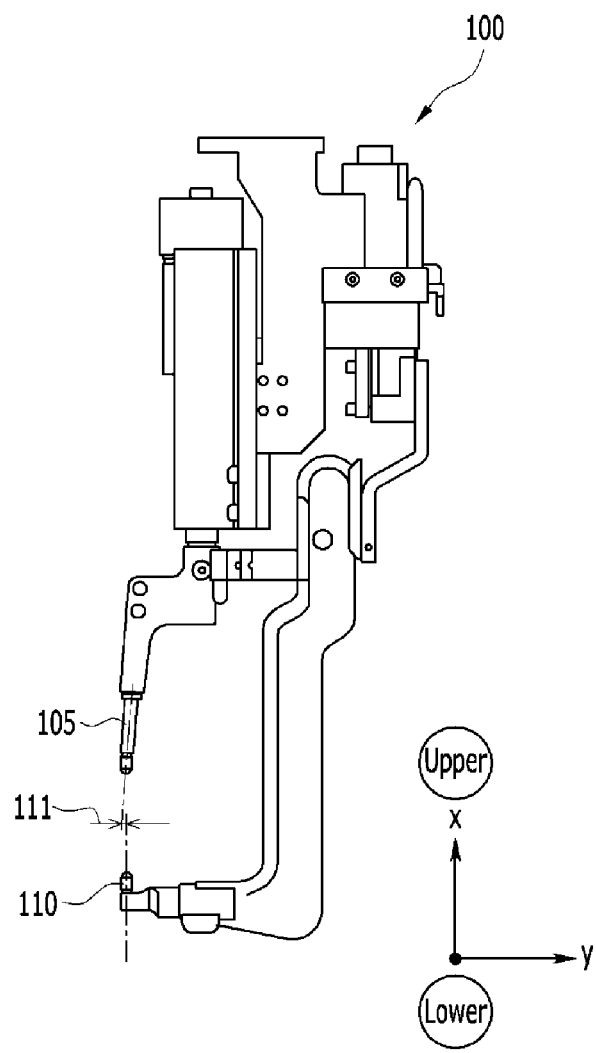
FIG. 1 is a side view of a welding unit according to an exemplary embodiment of the present invention.

FIG. 1 is a side view of a welding gun according to an exemplary embodiment of the present invention. Referring to FIG. 1, a welding unit 100 may include an upper tip 105 and a lower tip 110. The upper tip 105 and the lower tip 110 have a structure in which the upper and lower tips 105, 110 may be configured to move reciprocally in a vertical direction. For convenience of illustration, an exemplary embodiment describes the "upper" tip 105 and the "lower" tip 110. However, the upper tip 105 may be disposed at a lower portion, the lower tip 110 may be disposed at an upper portion, and/or the upper tip 105 and the lower tip 110 may also be disposed in a horizontal direction. At least two base metals may be disposed between the upper tip 105 and the lower tip 110. The upper tip 105 and the lower tip 110 may connect (e.g. abut) to upper and lower surfaces of the base metals. Power may be supplied to the upper tip 105 and the lower tip 110, causing the two base metals to have a spot-welding structure. Meanwhile, the upper tip 105 and the lower tip 110 may become misaligned to cause a mismatch 111 for various reasons, which may cause defects in a welded part.

Figure 2:
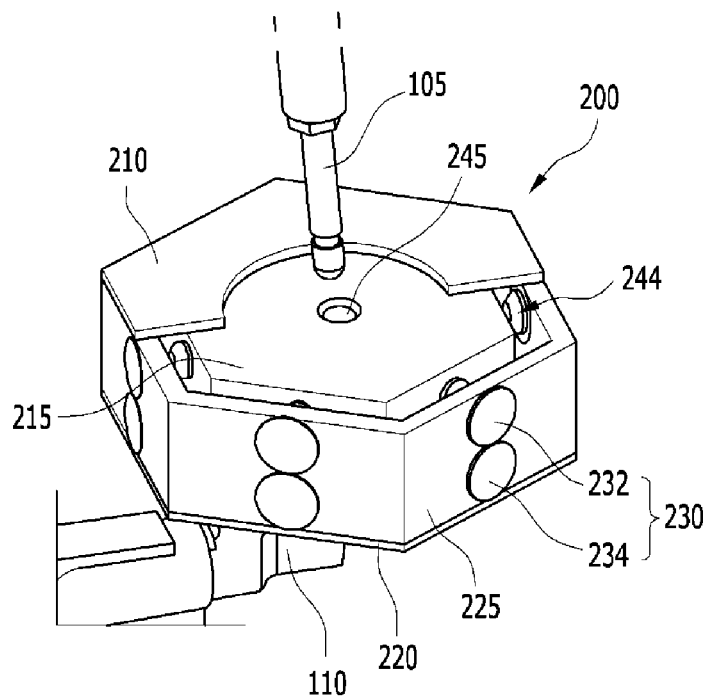
FIG. 2 is a partial cross-sectional view illustrating a welding gun alignment detection device applied to a welding gun according to an exemplary embodiment of the present invention.
Figure 6:
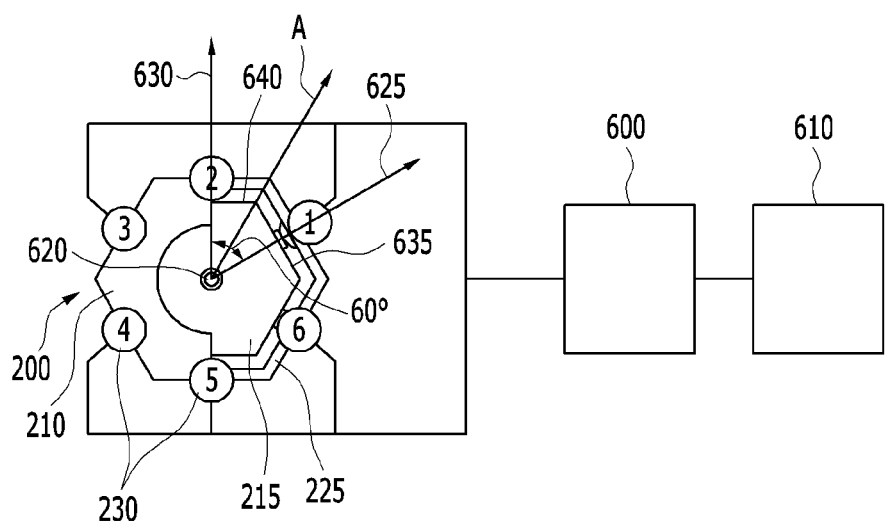
FIG. 6 is a configuration diagram of a welding gun alignment detection system according to an exemplary embodiment of the present invention.

According to an exemplary embodiment illustrated in FIG. 2, a welding gun alignment detection device 200 may include an upper cover 210, an upper block 215, a housing 225, a lower cover 220, a side pressure sensor 230, and a pressure transfer part 240. The upper block 215 may have a central portion of an upper surface including an upper tip insertion bore 245 that may correspond to the upper tip 105. The lower block 300 may have a central portion of a lower surface including a lower tip insertion bore (not illustrated) that corresponds to the lower tip 110. Outer sides of the upper block 215 and the lower block 300 may have six surfaces. Referring to FIG. 6, the six surfaces may be configured to vertically enclose a radial axis formed in a radial direction and may be configured to vertically align to a vertical reference line 620 that extends between the upper tip 105 and the lower tip 110.

The upper block 215 and the lower block 300 may slidably connect to one another. The upper and lower blocks 215, 300 may include the housing 225 having inner sides that correspond to the outer sides of the upper block 215 and the lower block 300. The housing 225 may be disposed (e.g. placed, oriented, etc.) to enclose the outer sides of the upper block 215 and the lower block 300. The outer sides of the upper block 215 and the lower block 300 and the inner side of the housing 225 may be spaced apart from each other at a predetermined interval. The pressure transfer part 240 may be interposed between the outer sides of the upper block 215 and the lower block 300 and the inner side of the housing 225.

A side pressure sensor 230 may be disposed in the housing 225 at a position that corresponds to the pressure transfer part 240. The side pressure sensor 230 may include an upper sensor 232 that corresponds to the upper block 215 and a lower sensor 234 corresponding to the lower block 300. The upper sensor 232 and the lower sensor 234 may be configured to elastically contract or expand in response to the applied force and a structure thereof refers to technologies well known in the art and therefore a detailed description thereof will be omitted. When the housing 225 is opened upward and/or downward (e.g. in an upward and/or downward direction), an upper cover 210 and a lower cover 220 that covers the upper and lower portions of the housing 225 may each be applied to (e.g. contact, etc.) the housing 225. Central portions of the upper cover 210 and the lower cover 220 may have an opened structure that corresponds to the upper tip insertion bore 245 and the lower tip insertion bore. The upper cover 210 and the lower cover 220 may therefore be configured to prevent the upper block 215 and the lower block 300 from being separated from the housing 225.

Figure 3:
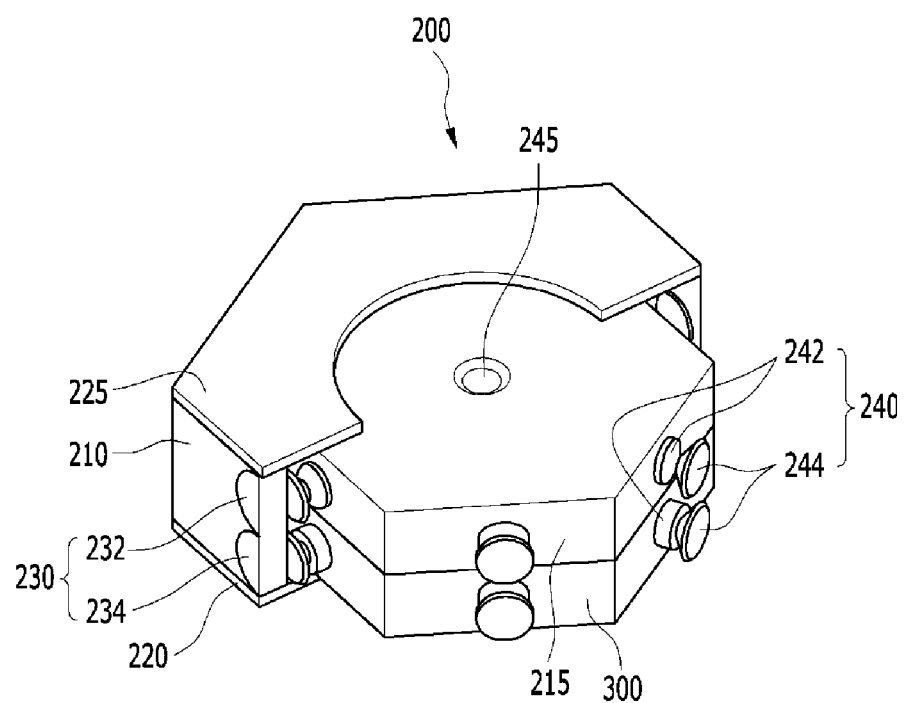
FIG. 3 is a partial cross-sectional view of the welding gun alignment detection device according to an exemplary embodiment of the present invention.

FIG. 3 is a cross-sectional perspective view of the welding gun alignment detection device according to an exemplary embodiment of the present invention. Descriptions of similar portions between FIGS. 2, 3, and 4 will not be repeated herein. The side pressure sensor 230 may include upper sensors 232 and lower sensors 234, in which the upper sensors 232 may each be disposed at an upper portion of the housing 225 and correspond to the side of the upper block 215. The lower sensors 234 may each be disposed at a lower portion of the housing 225 to correspond to the side of the lower block 300. The pressure transfer part 240 may include pressure transfer protrusions 242 and swivel members 244, in which the pressure transfer protrusions 242 integrally protrude from the sides of the upper block 215 and the lower block 300. The swivel members 244 may be fastened with the pressure transfer protrusions 242 and may be configured to transfer forces of the pressure transfer protrusions 242 to the upper sensor 232 and the lower sensor 234.

Figure 4:
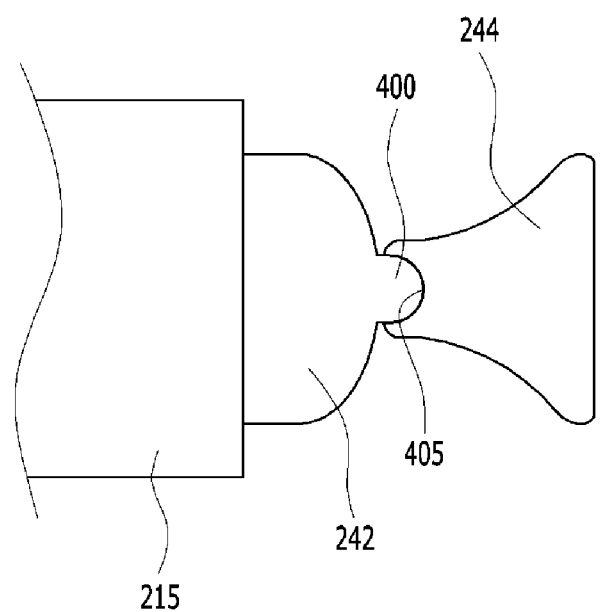
FIG. 4 is a partial cross-sectional view of the welding gun alignment detection device according to an exemplary embodiment of the present invention.

According to an exemplary embodiment illustrated in FIG. 4, a center of a front end of the pressure transfer protrusion 242 may include a ball 400 and the swivel member 244 may include a ball groove 405, in which the ball 400 may be seated. The ball 400 may be fastened with the ball groove 405 and may couple the pressure transfer protrusion 242 with the swivel member 244. Therefore, the swivel member 244 may be rotatably disposed in a multi-axis direction based on the ball 400 and may be configured to transfer the motions of the upper block 215 and the lower block 300 to the side pressure sensor 230. An exemplary embodiment of the present invention describes that the swivel member 244 includes the ball groove 405 and the pressure transfer protrusion 242 includes the ball 400. However, the pressure transfer protrusion 242 may include the ball groove 405 and the swivel member 244 may include the ball 400.

Figure 5A:
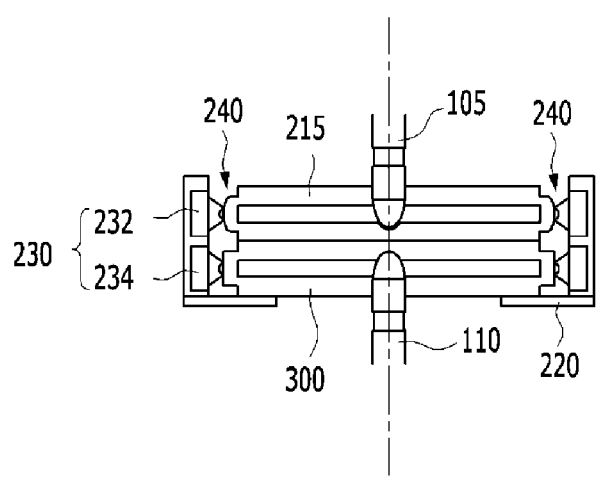
FIGS. 5A to 5D are side cross-sectional views illustrating the welding gun alignment detection device applied based on the alignment of the welding gun according to an exemplary embodiment of the present invention.

FIGS. 5A to 5D are side cross-sectional views illustrating the welding gun alignment detection device applied based on the alignment of the welding gun according to an exemplary embodiment of the present invention. Referring to FIG. 5A, the upper tip 105 may be inserted into the upper tip insertion bore 245 of the upper block 215 and the lower tip 110 may be inserted into the lower tip insertion bore of the lower block 300 when the upper tip 105 and the lower tip 110 are aligned on one axis. The upper tip 105 and the lower tip 110 may be disposed on one reference line to prevent the upper block 215 and the lower block 300 from moving. Therefore, a pressure may not be transferred to the upper sensor 232 and the lower sensor 234.

Figure 5B:
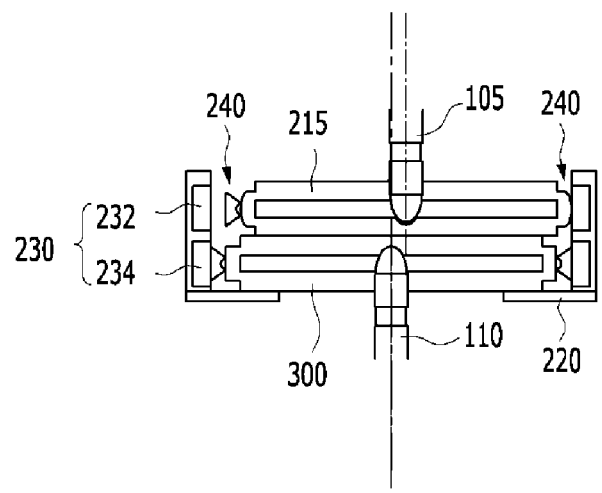

Referring to FIG. 5B, the upper tip 105 may be inserted into the upper tip insertion bore 245 of the upper block 215 and the lower tip 110 may be inserted into the lower tip insertion bore of the lower block 300 when the upper tip 105 is leaned (e.g. angled, inclined, bent, etc.) to the right of a reference line and the lower tip 110 matches the reference line. The upper tip 105 may be leaned to the right, and thus the upper block 215 may thus be configured to move right to meet the position of the upper tip 105. The upper block 215 may be configured to apply a pressure to one side of the upper sensor 232 using the pressure transfer part 240 and compress the upper sensor 232. The pressure or the amount by which the upper tip 105 leans (e.g. the leaned amount) detected by the upper sensor 232 may be transferred to a separate calculator 600 configured to calculate the leaned amount of the upper tip 105 based on the detected value and outputs the calculated leaned amount by an output unit 610 of a processor. In particular, the calculator may be operated by a controller having a memory and a processor. The upper block 215 and the lower block 300 may be configured such that the blocks 215, 230 may not move horizontally. Therefore, the pressure may not be transferred to the upper sensor 232 and the lower sensor 234.

Figure 5C:
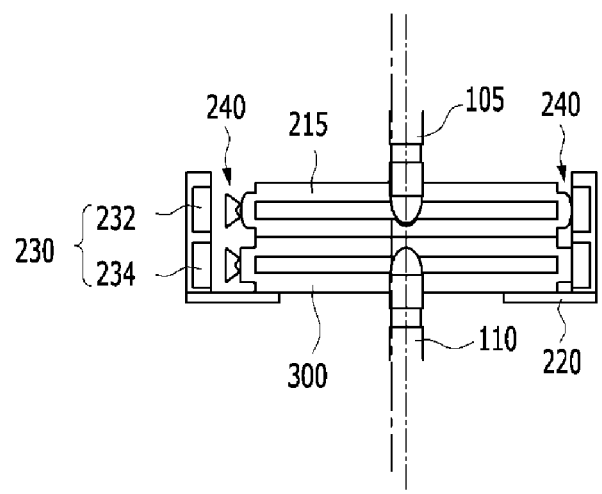

Referring to FIG. 5C, the upper tip 105 may be inserted into the upper tip insertion bore 245 of the upper block 215 and the lower tip 110 may be inserted into the lower tip insertion bore 245 of the lower block 300 when the upper tip 105 is leaned to the right based on a reference line and the lower tip 110 is leaned to the right from the reference line to a lesser degree than the upper tip 105. The upper tip 105 may be leaned to the right, and in response, the upper block 215 may be configured to move right based on the position of the upper tip 105. The lower tip 110 may be leaned to the right to a lesser degree than the upper tip 105, and in response, the lower block 300 may be configured to move to the right to a similar lesser degree as the lower tip 110 based on the position of the lower tip 110. The upper block 215 may be configured to apply a pressure to the upper sensor 232 using the pressure transfer part 240 and compress the upper sensor 232. The lower block 300 may be configured to apply a pressure to the lower sensor 234 using the pressure transfer part 240 and compress the lower sensor 234. The pressure or the leaned amount detected by the upper sensor 232 and the lower sensor 234 may be transferred to the separate calculator 600 configured to calculate the leaned amount of the upper tip 105 and the lower tip 110 based on the detected value and to output the calculated leaned amount using the output unit 610 of the processor.

Figure 5D:
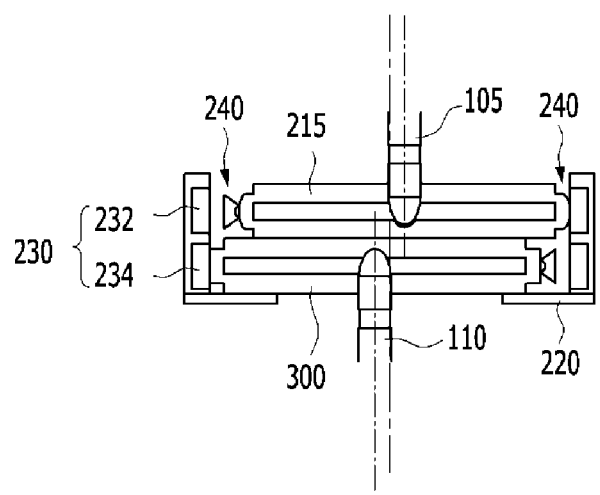

Referring to FIG. 5D, the upper tip 105 may be inserted into the upper tip insertion bore 245 of the upper block 215, and the lower tip 110 may be inserted into the lower tip insertion bore of the lower block 300 when the upper tip 105 is leaned to the right based on the reference line and the lower tip 110 is leaned to the left based on the reference line. The upper tip 105 may be leaned to the right, and in response, the upper block 215 may be configured to move right based on the position of the upper tip 105. The lower tip 110 may be leaned to the left, and in response, the lower block 300 may be configured to move to the left based on the position of the lower tip 110. The upper block 215 may be configured to apply a pressure to the upper sensor 232 using the pressure transfer part 240 and compress the upper sensor 232. The lower block 300 may be configured to apply a pressure to the lower sensor 234 using the pressure transfer part 240 and compress the lower sensor 234. The pressure or the leaned amount detected by the upper sensor 232 and the lower sensor 234 may be configured to be transferred to the separate calculator 600 configured to calculate the leaned amount of the upper tip 105 and the lower tip 110 based on the detected value and to output the calculated leaned amount using the output unit 610 of the processor.

According to an exemplary embodiment illustrated in FIG. 6, a welding gun alignment detection system may include the detection device 200, the calculator 600, and the output unit 610. The detection device 200, the calculator 600, and/or the output unit 610 may be operated by the controller. The detection device 200 may include the upper block 215 and the lower block 300 that may be disposed (e.g. placed, oriented, etc.) based on the vertical reference line 620. The detection device 200 may include a first radial axis 625 and a second radial axis 630 that may vertically pass through the vertical reference line 620 and may be formed radially. The first and second radial axes 625 and 630 may be formed at an exemplary angle of about 60°, and as illustrated, six radial axes may be formed.

Therefore, the upper block 215 and the lower block 300 may include a first pressure transfer surface 635 and a second pressure transfer surface 640 that may be vertical to the radial axes 625 and 630. The pressure transfer surfaces 635, 640 may be formed with six surfaces, and six side pressure sensors 230 may each be arranged within the housing 620 and correspond to the six transfer surfaces. In response to determining that pressure is transferred along the first radial axis 625 and pressure is transferred along the second radial axis 630, a force may be determined to be substantially transferred along one line A between the first and second radial axes 625 and 630. Accordingly, the calculator 600 may be configured to more accurately calculate the motion directions and the motion amounts of the upper block 215 and the lower block 300, respectively, based on the pressure signal transferred from the side pressure sensor 230. The calculator 600 may also be configured to digitize (e.g. to convert, change, etc. to digital form, such as in the form of numerical values) the leaned amount of the upper tip 105 or the lower tip 110 based on the calculated moving direction and moving amount. The output unit 610 of the processor may be configured to display on a screen and/or other display device the alignment, the leaned amount, the leaned direction, etc., of the upper tip 105 and the lower tip 110 that may be calculated by the calculator 600.

While this invention has been described in connection with reference to exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

100: Welding unit
105: Upper tip
110: Lower tip
111: Mismatch
200: Detection device
210: Upper cover
215: Upper block
220: Lower cover
225: Housing
230: Side pressure sensor
232: Upper sensor
234: Lower sensor
240: Pressure transfer part
242: Pressure transfer protrusion
244: Swivel member
245: Upper tip insertion hole
300: Lower block
400: Ball
405: Ball groove
600: Calculator
610: Output unit
620: Reference line
625: First radial axis
630: Second radial axis
635: First pressure transfer surface
640: Second pressure transfer surface

What is claimed is:

1. A welding gun alignment detection device, comprising:
   an upper block including a central portion having an upper tip insertion bore opened upward;
   a lower block disposed under the upper block and including a central portion having a lower tip insertion bore opened downward;
   a housing having the upper block and the lower block disposed therein and including inner sides each facing outer sides of the upper block and the lower block; and
   a side pressure sensor configured to detect a force transferred to the inner side of the housing due to a movement of the upper block and the lower block.

2. The welding gun alignment detection device of claim 1, further comprising:
   an upper cover and a lower cover configured to cover an upper portion and a lower portion of the housing, respectively, to expose the upper tip insertion bore and the lower tip insertion bore upward and downward.

3. The welding gun alignment detection device of claim 1, wherein the side pressure sensor includes:
   an upper sensor that corresponds to a side of the upper block; and
   a lower sensor that corresponds to a side of the lower block.

4. The welding gun alignment detection device of claim 1, wherein:
   a reference line passes through a center of the upper tip insertion bore and a center of the lower tip insertion bore,
   at least two radial axes radially formed vertically from the reference line, and
   the outer sides of the upper block and lower block are each vertically formed to the radial axes.

5. The welding gun alignment detection device of claim 1, further comprising:
   a pressure transfer part disposed between the outer side of the upper block and the inner side of the housing and configured to transfer a pressure.

6. The welding gun alignment detection device of claim 5, wherein the pressure transfer part includes:
   a pressure transfer protrusion that protrudes from the outer side of the upper block; and a swivel member interposed between the pressure transfer protrusion and the inner side of the housing and rotatably disposed in a multi-axis direction by a ball and a ball groove.

7. The welding gun alignment detection device of claim 6, wherein:
the ball is formed at the pressure transfer protrusion,
the ball groove is formed at the swivel member, and
the pressure transfer protrusion is fastened with the swivel member to insert the ball into the ball groove.

8. The welding gun alignment detection device of claim 4, wherein:
the outer sides include at least two outer sides and the inner sides include at least two inner sides, and
the radial axes are each disposed at about an equal angle.

9. The welding gun alignment detection device of claim 4, further comprising:
a calculator configured to calculate motion directions and moving amounts of the upper block and the lower block based on a pressure applied from the outer sides toward the inner sides using the side pressure sensor; and
a processor configured to output results calculated by the calculator.

10. The welding gun alignment detection device of claim 9, wherein:
the processor is configured to display by numerical values regarding an alignment of an upper tip inserted into the upper tip insertion bore and a lower tip inserted into the lower tip insertion bore on a display.

11. A welding gun alignment detection device, comprising:
an upper block including a central portion having an upper tip insertion bore opened upward;
a lower block disposed under the upper block and including a central portion having a lower tip insertion bore opened downward;
a housing in which the upper block and the lower block are disposed and including inner sides each facing outer sides of the upper block and the lower block;
a side pressure sensor configured to detect a force transferred to the inner side of the housing due to a movement of the upper block and the lower block; and
a calculator configured to calculate pressure values transferred from the upper block and the lower block using the side pressure sensor.

12. The welding gun alignment detection device of claim 11, wherein:
the calculator is configured to calculate motion directions and amounts of the upper block and the lower block based on the pressure values.

13. The welding gun alignment detection device of claim 11, further comprising:
a processor configured to output the pressure value calculated by the calculator and the motion directions and amounts of the upper block and the lower block.

14. A method of determining alignment of a welding gun with an upper tip and a lower tip, comprising:
inserting the upper tip into an upper tip insertion bore on an upper block within a housing;
inserting the lower tip into a lower tip insertion bore on a lower block disposed under the upper block within the housing;
detecting a force transferred to an inner side of the housing due to a movement of the upper block and the lower block; and
calculating pressure values transferred from the upper block and the lower block.

15. The method of claim 14, further comprising:
outputting the pressure values and the motion directions and amounts of the upper block and the lower block.

* * * * *